United States Patent

Pollack et al.

[11] Patent Number: 5,251,509
[45] Date of Patent: Oct. 12, 1993

[54] ADAPTIVE PRESSURE CONTROL FOR AN AUTOMATIC TRANSMISSION

[75] Inventors: Scott B. Pollack, Livonia; Joseph L. Wanamaker, Tecumseh, both of Mich.

[73] Assignee: General Motors Corporation, Detroit, Mich.

[21] Appl. No.: 862,930

[22] Filed: Apr. 3, 1992

[51] Int. Cl.$^5$ .............................................. B60K 41/06
[52] U.S. Cl. .................................... 74/861; 74/866; 364/424.1
[58] Field of Search ............... 74/861, 866; 364/424.1

[56] References Cited

U.S. PATENT DOCUMENTS

| | | | |
|---|---|---|---|
| 4,283,970 | 8/1981 | Vukovich | 74/866 |
| 4,653,350 | 3/1987 | Downs et al. | 74/864 |
| 4,845,618 | 7/1989 | Narita | 74/866 X |
| 4,953,090 | 8/1990 | Narita | 74/866 X |
| 5,070,747 | 12/1991 | Lentz et al. | 74/866 |
| 5,086,665 | 2/1992 | Milunas et al. | 74/867 X |
| 5,086,670 | 2/1992 | Nitz et al. | 74/866 |
| 5,163,342 | 11/1992 | Pollack et al. | 74/866 |

*Primary Examiner*—Leslie A. Braun
*Assistant Examiner*—David E. Henn
*Attorney, Agent, or Firm*—Mark A. Navarre

[57] ABSTRACT

An improved adaptive pressure control which accounts for nonlinearity in the relationship between fluid pressure and shift time. To account for nonlinearity in the relationship between cumulative shift time error and corrective pressure, the control utilizes an empirically derived table of shift time vs. controlled pressure to develop a raw pressure error in lieu of a shift time error. The adaptive pressure correction, in turn, is developed in relation to the cumulative pressure error. This removes the effect of system nonlinearity from the adaptive control, allowing more accurate adaptive convergence than was heretofore achieved.

3 Claims, 10 Drawing Sheets

| GEAR | RATIO | C1 | C2 | C3 | C4 | C5 | OC | CR |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | ON | OFF |
| R | -2.06 | OFF | OFF | ON | OFF | OFF | ON | ON |

FIG. 2

| SOLENOID STATES | | | |
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 3

ADAPTIVE PRESSURE CONTROL FOR AN AUTOMATIC TRANSMISSION

This invention relates to adaptive pressure compensation control in a motor vehicle automatic transmission, and more particularly, to a control for providing a pressure correction which is linearly related to the required compensation.

Background of the Invention

Automatic transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling, such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios. Accordingly, shifts from a given speed ratio to a lower speed ratio are referred to as downshifts, while shifts from a given speed ratio to a higher speed ratio are referred to as upshifts.

In most transmissions, ratio shifting is carried out by selectively directing the fluid pressure output of a pump, referred to as line pressure, to the various clutches of the transmission through the use of one or more shift valves. To upshift from a lower speed ratio to a higher speed ratio, for example, a respective shift valve is activated (electrically or hydraulically) to initiate the supply of fluid pressure to the upper or target speed ratio (on-coming) clutch. Concurrently, the lower speed ratio (off-going) clutch is released, either by exhausting the fluid pressure supplied to it, or through the provision of a one-way device which overruns when the on-coming clutch achieves the required torque capacity.

It is known that the firmness of a shift can be controlled to a desired value over the life of the transmission through adaptive adjustment of the pressure supplied to the on-coming clutch. In transmissions utilizing a hydraulic accumulator to control the rise in fluid pressure at the clutch, the accumulator back-pressure (trim pressure) can be adjusted to modify the clutch pressure; see for example, the U.S. Pat. No. 4,283,970 to Vukovich, issued Aug. 18, 1981, and assigned to the assignee of the present invention.

In transmissions which provide direct control of the clutch pressure in accordance with a predetermined pressure profile, the scheduled pressure or the supply pressure may be adjusted to modify the clutch pressure; see, for example, the U.S. Pat. No. 4,653,350 to Downs et al., issued Mar. 31, 1987, and also assigned to the assignee of the present invention. In either case, the controlled pressure is scheduled as a combined function of a base pressure value determined by table look-up and an adaptive pressure value based on a deviation between actual and desired shift times observed during a previous shift of the same type.

SUMMARY OF THE PRESENT INVENTION

The present invention is directed to an improved adaptive pressure control which accounts for nonlinearity in the relationship between fluid pressure and shift time. To account for such nonlinearity, the control of the present invention utilizes an empirically derived table of shift time vs. controlled pressure to develop a raw pressure error in lieu of a shift time error. The adaptive pressure correction, in turn, is developed in relation to the cumulative pressure error. This removes the effect of system nonlinearity from the adaptive control, allowing significantly more accurate adaptive convergence than was heretofore achieved.

BRIEF DESCRIPTION OF THE DRAWINGS

FIG. 2 is a state diagram for the clutches of the transmission depicted in FIGS. 1a-1b.

FIG. 3 is a chart depicting the electrical state changes required for shifting from one speed ratio to another.

DETAILED DESCRIPTION OF THE INVENTION

Figure 1A:
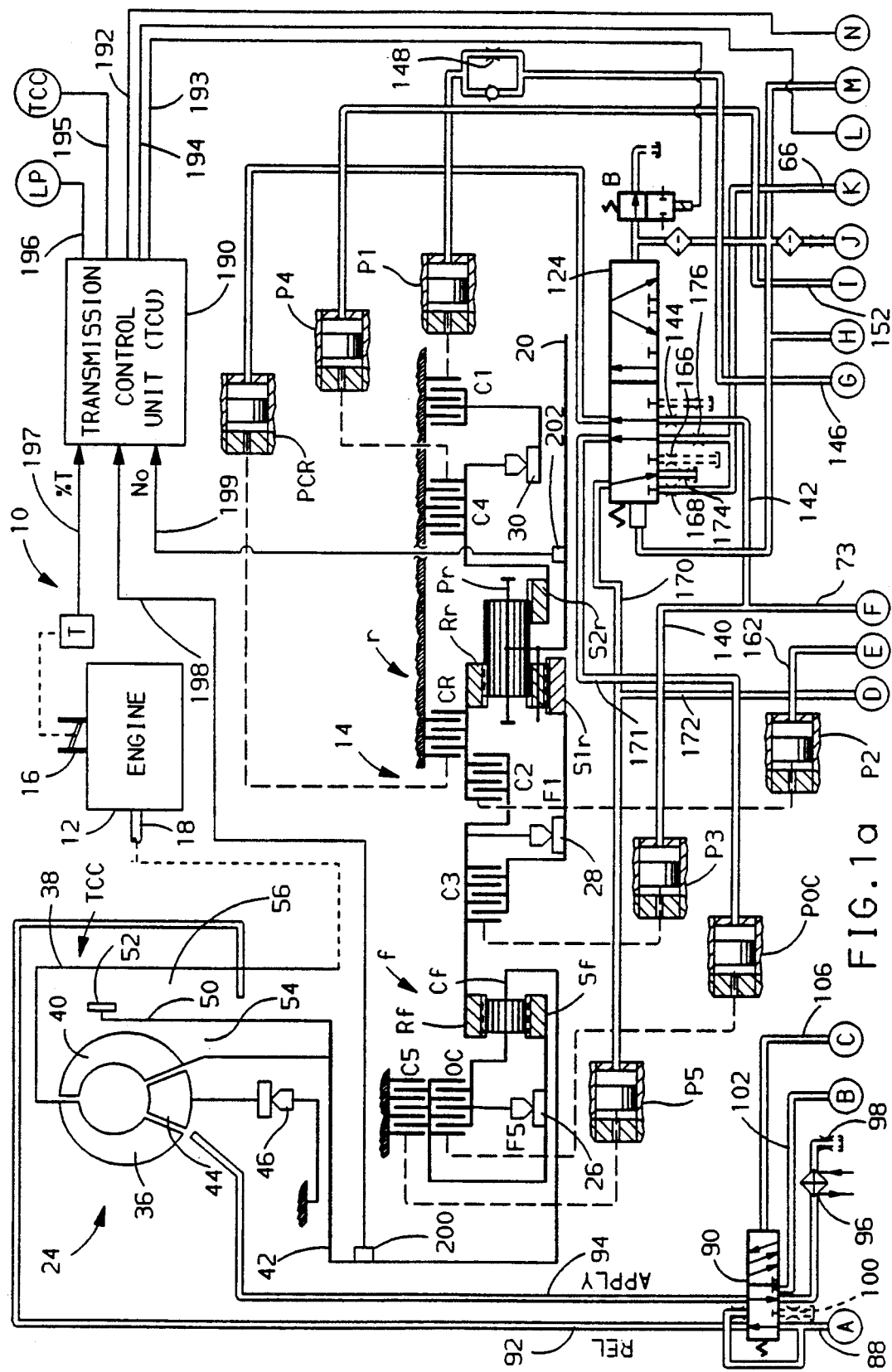
FIGS. 1a-1b form a schematic diagram of a five-speed automatic transmission controlled in accordance with this invention by a computer-based control unit.
Figure 1B:
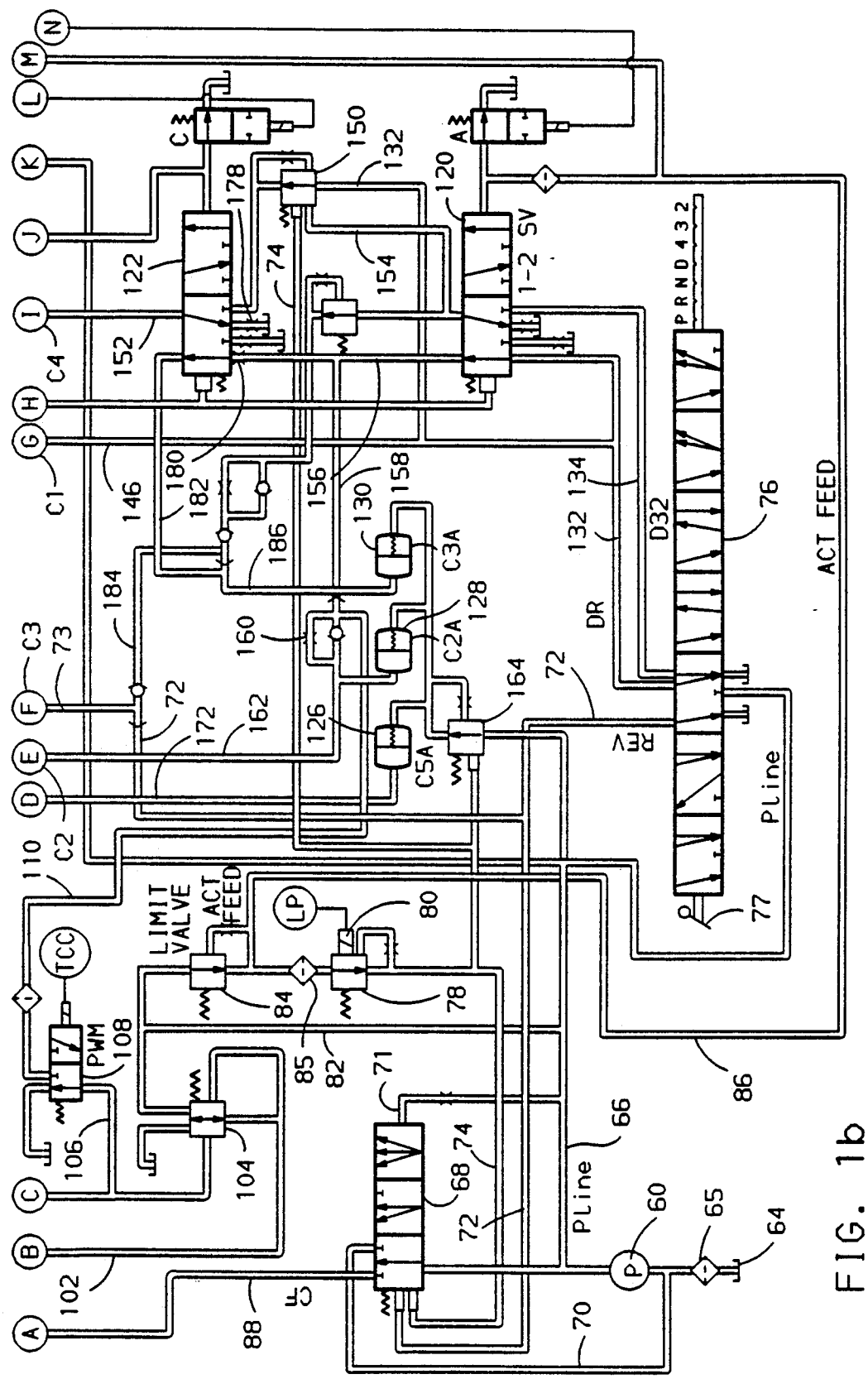

Referring now to FIGS. 1a-1b of the drawings, the reference numeral 10 generally designates a motor vehicle drivetrain including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18. The transmission 14, in turn, transmits engine output torque to an output shaft 20 through a torque converter 24 and one or more of the fluid operated clutches C1-C5, OC, Reverse clutch CR, and one-way clutches 26-30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38, as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The pinion Pr mechanically couples the pinion gears and is connected as an output to shaft 20.

The various speed ratios and the clutch states required to establish them are set forth in the chart of FIG. 2. Referring to that Figure, it is seen that the Park/Neutral condition is established by releasing all of the clutches with the exception of clutch OC. A garage shift to Reverse is effected by engaging the C3 and CR clutches. In the forward speed ranges, a garage shift to 1st is effected by engaging the clutches C1 and C4. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd and 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

Completing the shift analysis, the upshift from 4th to 5th is effected by engaging clutch C5 (and releasing clutch OC if engine braking is selected) to operate the forward gearset f in an overdrive condition, thereby providing a Ni/No ratio of 0.74. Downshifting from 5th to 4th is effected by releasing clutch C5 (and engaging clutch OC if engine braking is selected).

A positive displacement hydraulic pump 60 is mechanically driven by the engine output shaft 18. Pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which, in turn, directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98.

When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110.

When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1-C5, OC and CR are activated by conventional fluid operated pistons P1-P5, POC and PCR, respectively. The pistons, in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120-124 for application to the fluid operated pistons P1-P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 3, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated trim pressure developed by valve 164. The engagement of clutch C2 is thereby cushioned as the C2 apply pressure, resisted by spring force and the trim pressure, strokes the piston of accumulator 128. Of course, a 2-1 downshift is effected by energizing the Solenoid Operated Valve A.

Referring again to the chart of FIG. 3, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch C5. Line 170 is connected via line 172 as an input to accumulator 126, the backside of which is maintained at the regulated trim pressure developed by valve 164. The engagement of clutch C5 is thereby cushioned as the C5 apply pressure, resisted by spring force and the trim pressure, strokes the piston of accumulator 126. Of course, a 3-2 downshift is effected by deenergizing the Solenoid Operated Valve B.

Referring again to the chart of FIG. 3, a 3-4 upshift is effected by deenergizing Solenoid Operated Valves B and C to return Shift Valves 124 and 122 to their default positions, as depicted in FIGS. 1a-1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3.

Line 182 is connected via line 186 as an input to accumulator 130, the backside of which is maintained at the regulated trim pressure developed by valve 164. The engagement of clutch C3 is thereby cushioned as the C3 apply pressure, resisted by spring force and the trim pressure, strokes the piston of accumulator 130. Of course, a 4-3 downshift is effected by energizing the Solenoid Operated Valves B and C.

Referring again to the chart of FIG. 3, a 4-5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force and the trim pressure, strokes the piston of accumulator 126. Of course, a 5-4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192-196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198 and an output speed signal No on line 199. The throttle signal is based on the position of engine throttle 16, as sensed by transducer T; the turbine speed signal is based on the speed of turbine shaft 42, as sensed by sensor 200; and the output speed signal is based on the speed of output shaft 20, as sensed by sensor 202. In carrying out the control, the TCU 190 executes a series of computer program instructions, represented by the flow diagrams of FIGS. 7-8 and 9a-9c described below.

As indicated above, the present invention concerns the development of an adaptive correction for a predetermined pressure schedule as a means of compensating for variability due to tolerance variations, wear, etc. As set forth in the above-referenced Vukovich and Downs et al. patents, shift quality may be judged by comparing a measure of the actual shift time with a reference or desired time. If the measured shift time is significantly greater than the desired shift time under normal shift conditions, the pressure correction adds to the scheduled pressure during the next such shift to reduce the shift time. If the measured shift time is significantly less than the desired shift time, the pressure correction subtracts from the scheduled pressure during the next such shift to increase the shift time. Over a number of shifts, the pressure correction compensates for various sources of error, and the measured shift time is brought into correspondence with the desired shift time.

Figure 4:
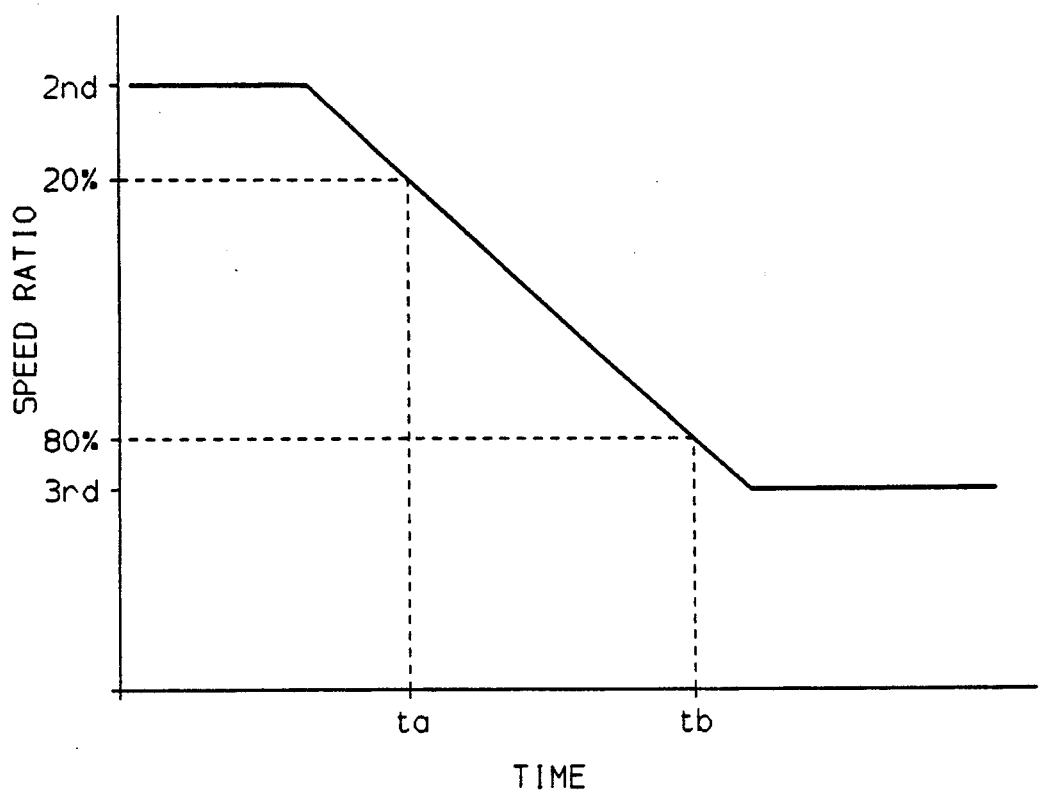
FIG. 4 graphically illustrates the change in transmission speed ratio during an upshift.

The measured shift time is most precisely characterized in terms of the time required for the transmission speed ratio to change from its pre-shift value to its post-shift value. This interval is customarily referred to in the art as the inertia phase of the shift. FIG. 4 depicts the progression of the transmission speed ratio from 2nd to 3rd in the course of a 2-3 upshift. To avoid nonlinearity in the initial and final stages of ratio progression, the shift time is preferably defined as the time elapsed during a predetermined intermediate portion of the ratio progression. Referring to FIG. 4, the shift time is defined in the illustrated embodiment as the interval ta-tb, the ratio progression being 20% complete at time ta and 80% complete at time tb.

Figure 5:
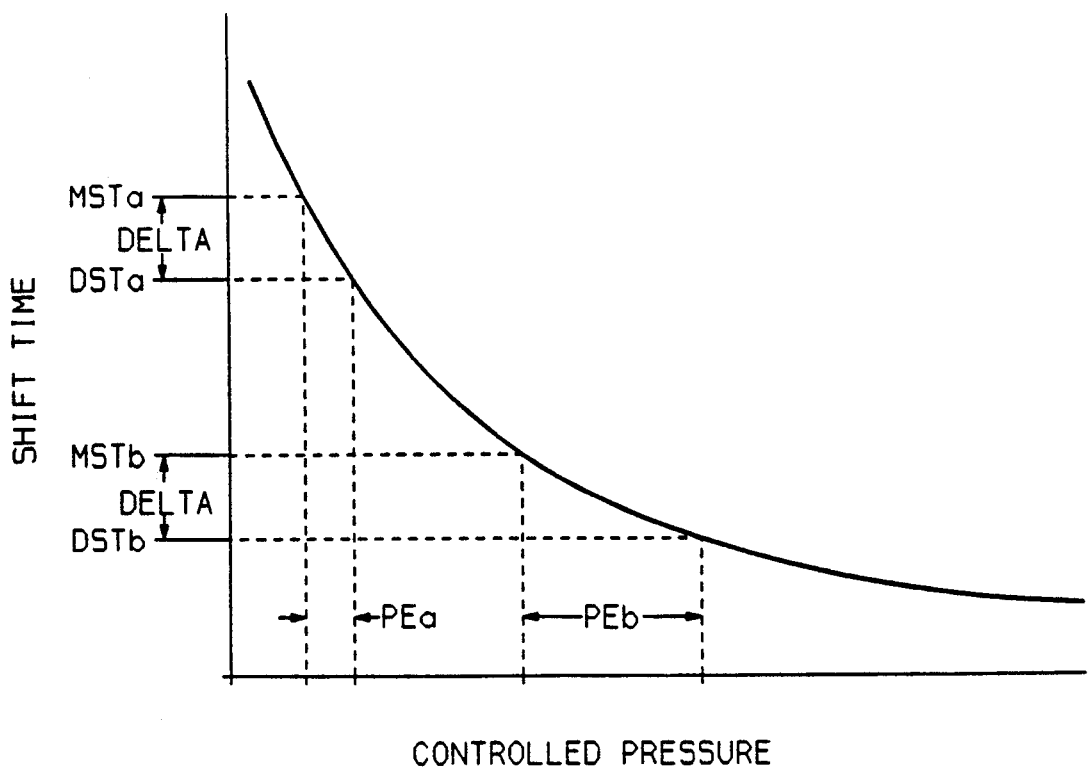
FIG. 5 graphically illustrates a measured shift time vs. pressure characteristic.

As indicated above, a difficulty in developing a suitable pressure correction based on the deviation of the measured shift time from a desired shift time is that the relationship between shift time and control pressure is typically nonlinear. In the above-referenced patent to Downs et al., the pressure correction gain table compensates for nonlinearities at a given desired shift time. However, the desired shift time changes with operating conditions, and the nonlinearities cannot be modeled by a single gain table. This is illustrated in FIG. 5, where the solid trace depicts measured shift time as a function of the controlled pressure. A first shift having a desired shift time of DSTa, a measured shift time of MSTa, and thus, a shift time error of DELTA, occurs due to a pressure error of PEa. A second shift having a desired shift time of DSTb, a measured shift time of MSTb, and the same shift time error of DELTA, occurs due to a pressure error of PEb which is much larger than PEa. Clearly, different pressure corrections are required to correct a given shift time error, depending on the desired shift time.

The above-described difficulty is overcome, according to the present invention, by storing within control unit 190 a representation of the empirically derived function depicted in FIG. 5, and applying the measured and desired shift times to the stored function to determine the required pressure correction (error) directly. The determined pressure error is apportioned among low and high shift torque adaptive correction cells and cell error values are integrated to develop adaptive correction values.

Figure 6:
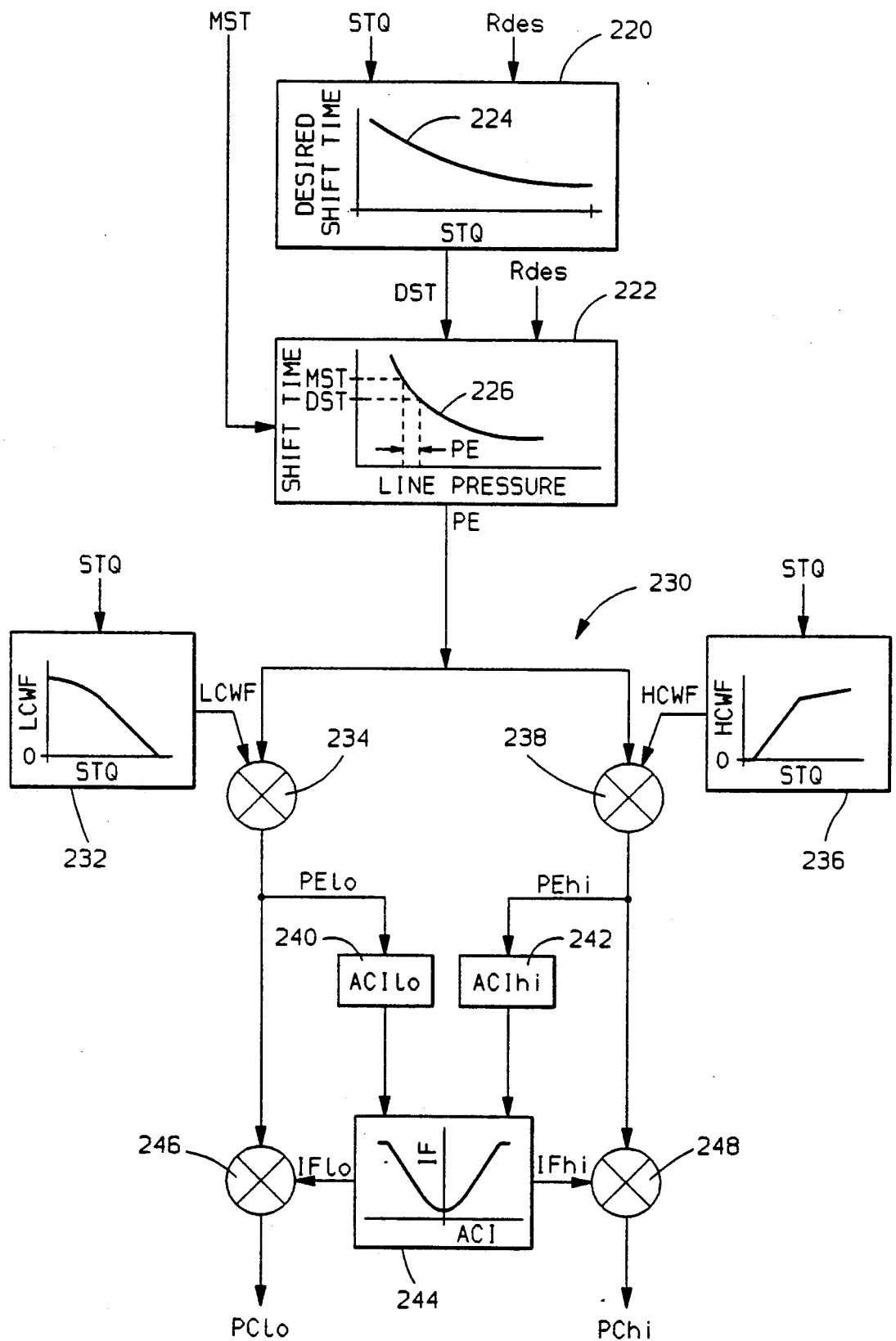
FIG. 6 is a schematic diagram of the control of this invention.

A schematic diagram of the control of this invention is depicted in FIG. 6. The blocks 220 and 222 determine an overall pressure error PE upon completion of each scheduled upshift. The block 220 provides a desired shift time (DST) as a function of the target speed ratio Rdes and an estimate of the shift torque, STQ. The shift torque STQ is determined according to the sum of the gearset input torque and the inertia torque required to complete the shift. The gearset torque may be computed in relation to the product of the engine output torque and the estimated torque multiplication provided by torque converter 24. The inertia torque may be estimated in relation to the turbine speed Nt at the initiation of the shift. The trace 224 shown within the block 220 represents the stored DST vs. STQ relationship for a given target ratio.

The desired shift time DST developed at block 220, the measured shift time MST and the target speed ratio Rdes are provided as inputs to the block 222 for the purpose of developing the pressure error PE. The block 222 stores an empirically derived relationship between measured shift time MST and transmission line pressure for each target speed ratio, similar to the function depicted in FIG. 5. Both the measured shift time MST and the desired shift time DST are applied to the stored function to determine corresponding line pressure values Pmst and Pdst. The difference between the pressure values (Pmst−Pdst) forms the pressure error output PE. Significantly, the pressure error can be positive or negative, for respectively increasing or decreasing the scheduled line pressure in subsequent shifting of the same type.

The pressure error from block 222 is applied to the error characterization portion of the control, designated generally by the reference numeral 230, which forms high and low pressure correction amounts PChi and PClo based on the pressure error PE. These correction amounts define a two-point table of pressure correction as a function of shift torque STQ. As described below in reference to the flow diagram of FIG. 9, the pressure command during shifting is determined as a combined function of the scheduled base pressure and the correction value determined from the two-point correction table.

The error characterization control portion initially apportions the pressure error PE between high and low pressure error values PEhi and PElo through the operation of blocks 232-238. The blocks 232 and 236 develop low and high cell weight factors LCWF and HCWF in relation to shift torque STQ, and the weight factors LCWF and HCWF are applied to the pressure error PE at blocks 234 and 238 to form the low and high pressure error values PElo and PEhi. The low and high pressure error values PElo and PEhi are individually integrated at blocks 240 and 242, and applied to the gain table of block 244 to form low and high integral factors IFlo and IFhi. The integral factors IFlo and IFhi, in turn, are applied to PElo and PEhi at blocks 246 and 248, respectively, to form the low and high pressure correction terms PClo and PChi.

Figure 7:
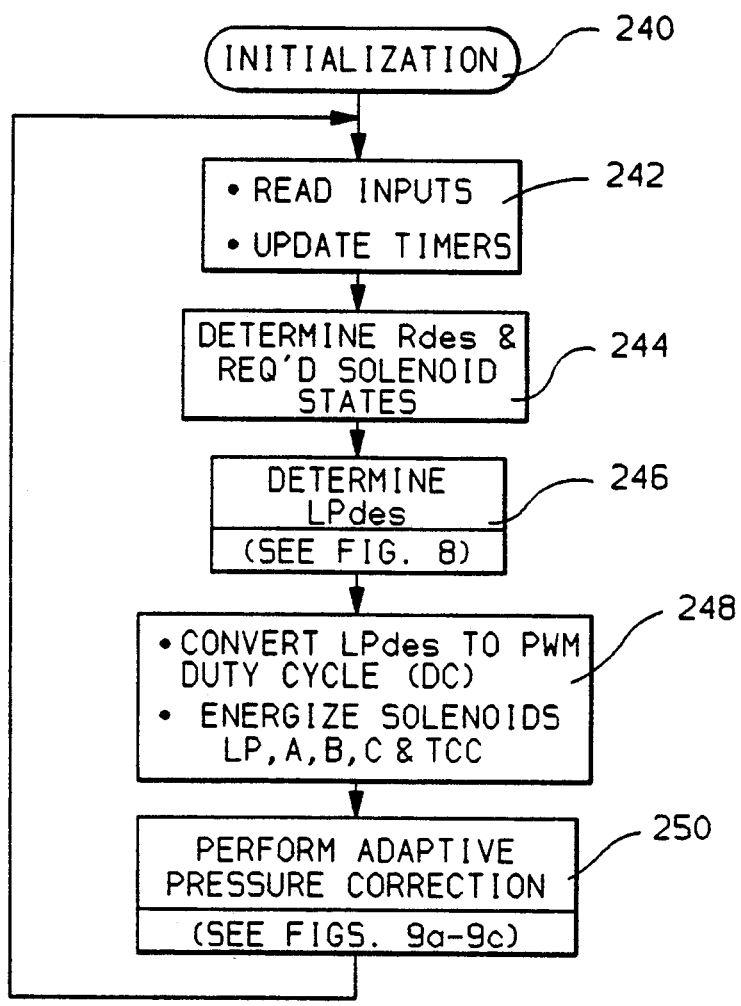
FIGS. 7-8 and 9a-9c depict flow diagrams representative of computer program instructions executed by the control unit of FIG. 1a in carrying out the control of this invention.

Referring now to FIGS. 7-8 and 9a-9c, the flow diagram of FIG. 7 represents a main or executive computer program which is periodically executed in the course of vehicle operation in carrying out the control of this invention. The block 240 designates a series of program instructions executed at the initiation of each period of vehicle operation for setting various terms and timer values to an initial condition. Thereafter, the blocks 242-250 are sequentially and repeatedly executed as indicated by the flow diagram lines.

At block 242, the control unit 190 reads the various inputs referenced in FIG. 1a and updates the loop timers, if any. The block 244 determines the desired speed ratio Rdes and required states of solenoids A, B and C for achieving the desired speed ratio. The desired ratio Rdes may be determined in a conventional manner as a predefined function of engine throttle position TPS and vehicle speed Nv.

Figure 8:
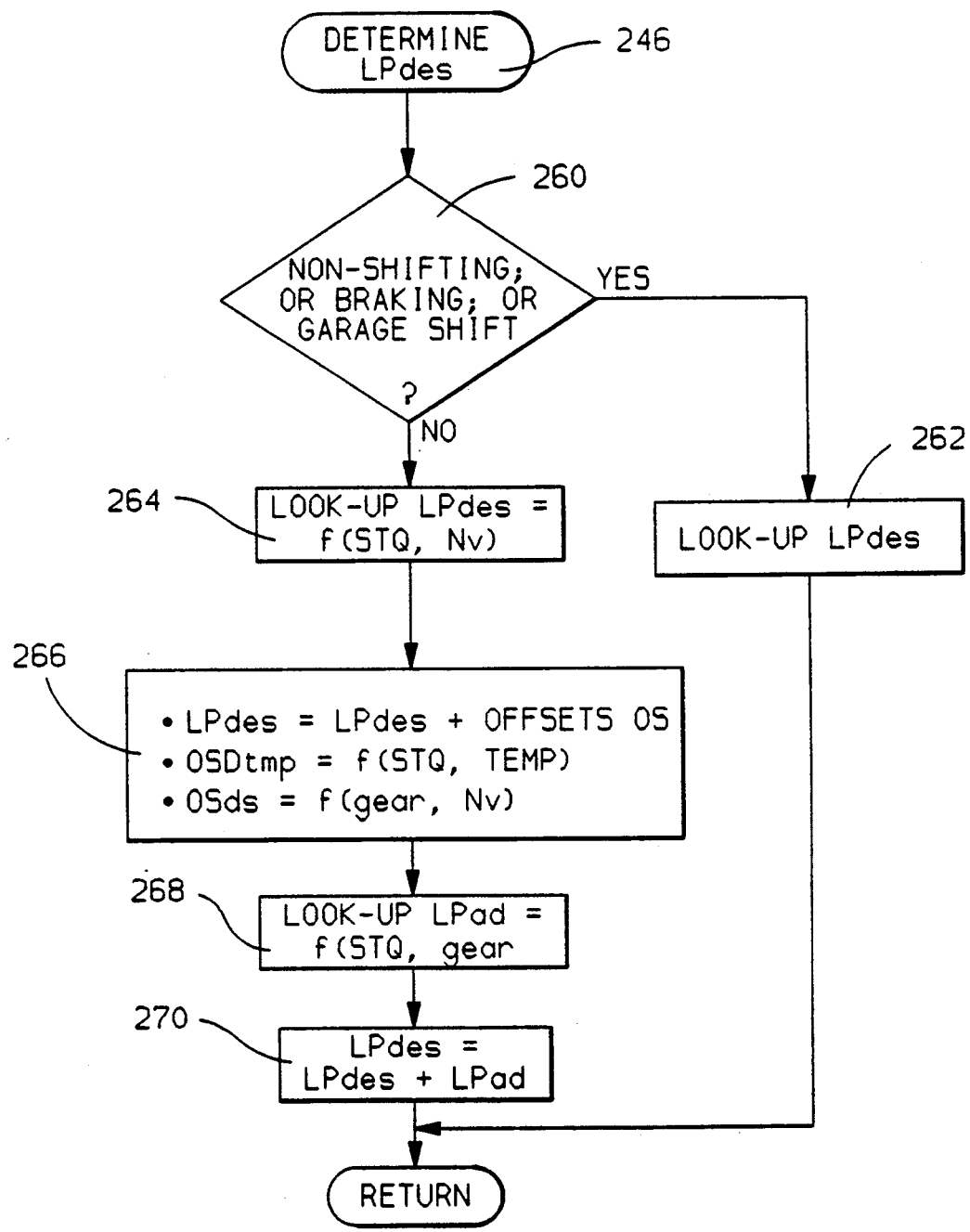

The block 246, described in further detail in the flow diagram of FIG. 8, determines the desired line pressure LPdes. The block 248 converts the desired line pressure LPdes to a PWM duty cycle for force motor 80, and suitably energizes the various electro-hydraulic elements, including the force motor 80, the TCC solenoid valve 108, and shift valve solenoids A, B and C. The block 250, described in further detail in the flow diagram of FIGS. 9a-9c, develops adaptive pressure corrections as described above with respect to the control system diagram of FIG. 6.

Referring to the line pressure determination flow diagram of FIG. 8, the block 260 is first executed to determine if the transmission is in a nonshifting mode, an engine braking mode, or if a garage shift is in progress. If any of these conditions are true, the block 262 is executed to determine the desired line pressure LPdes using mode-specific look-up tables, not described herein. Otherwise, the transmission is in a shifting mode, and the blocks 264-270 are executed to look-up the base line pressure LPdes as a function of shift torque STQ and vehicle speed Nv, to apply the appropriate offsets, and to look-up and apply the adaptive correction amount LPad.

The offsets identified in block 266 include a downshift offset OSds and a temperature offset OStemp. The downshift offset OSds is determined as a function of gear and vehicle speed Nv, and the temperature offset OStemp is determined as a function of the transmission oil temperature.

As noted above with respect to the control system diagram of FIG. 6, the adaptive pressure correction LPad is determined as a function of the shift torque STQ and the target speed ratio. This look-up involves an interpolation between the high and low pressure correction values PChi and PClo defined in reference to FIG. 6.

Figure 9A:
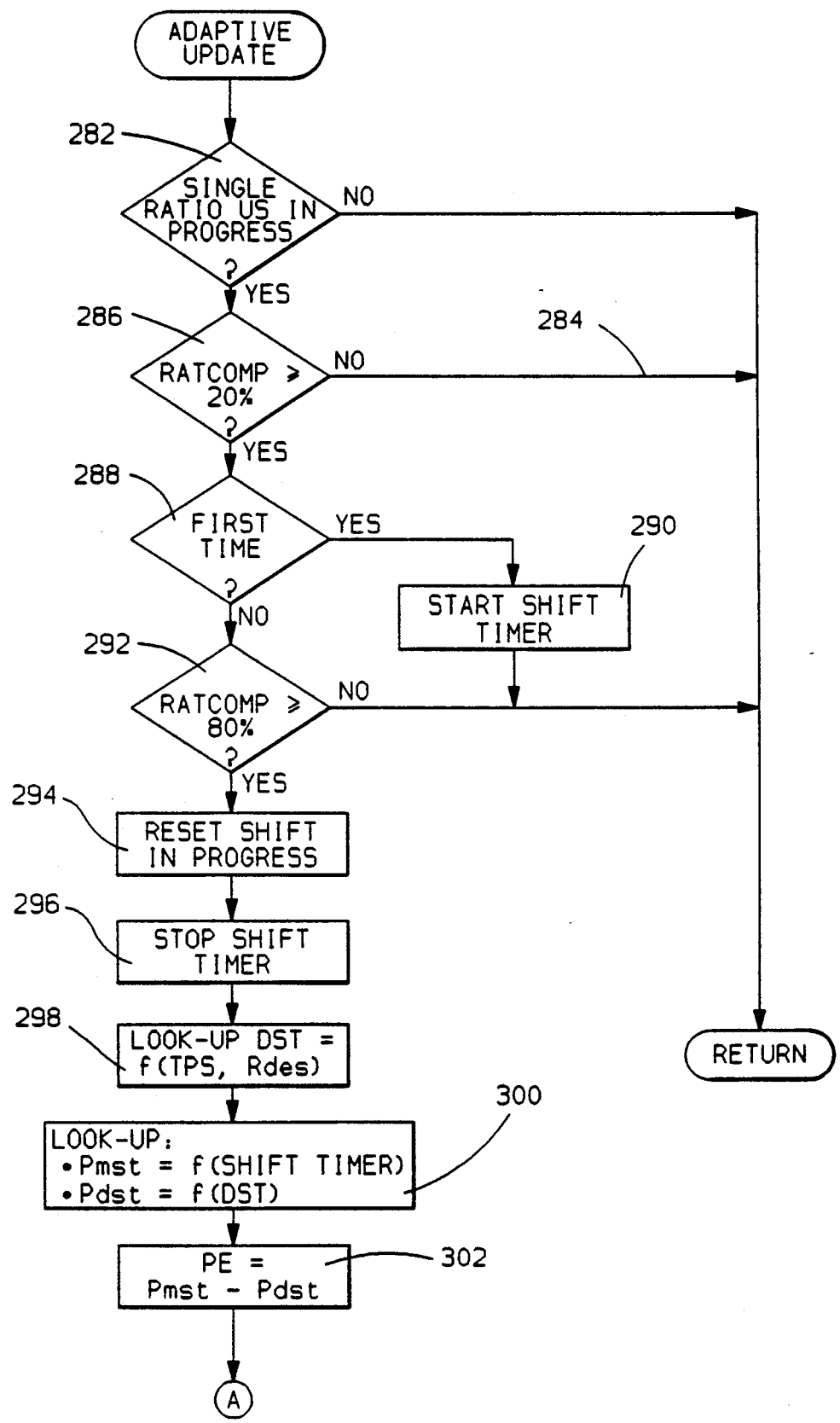
Figure 9B:
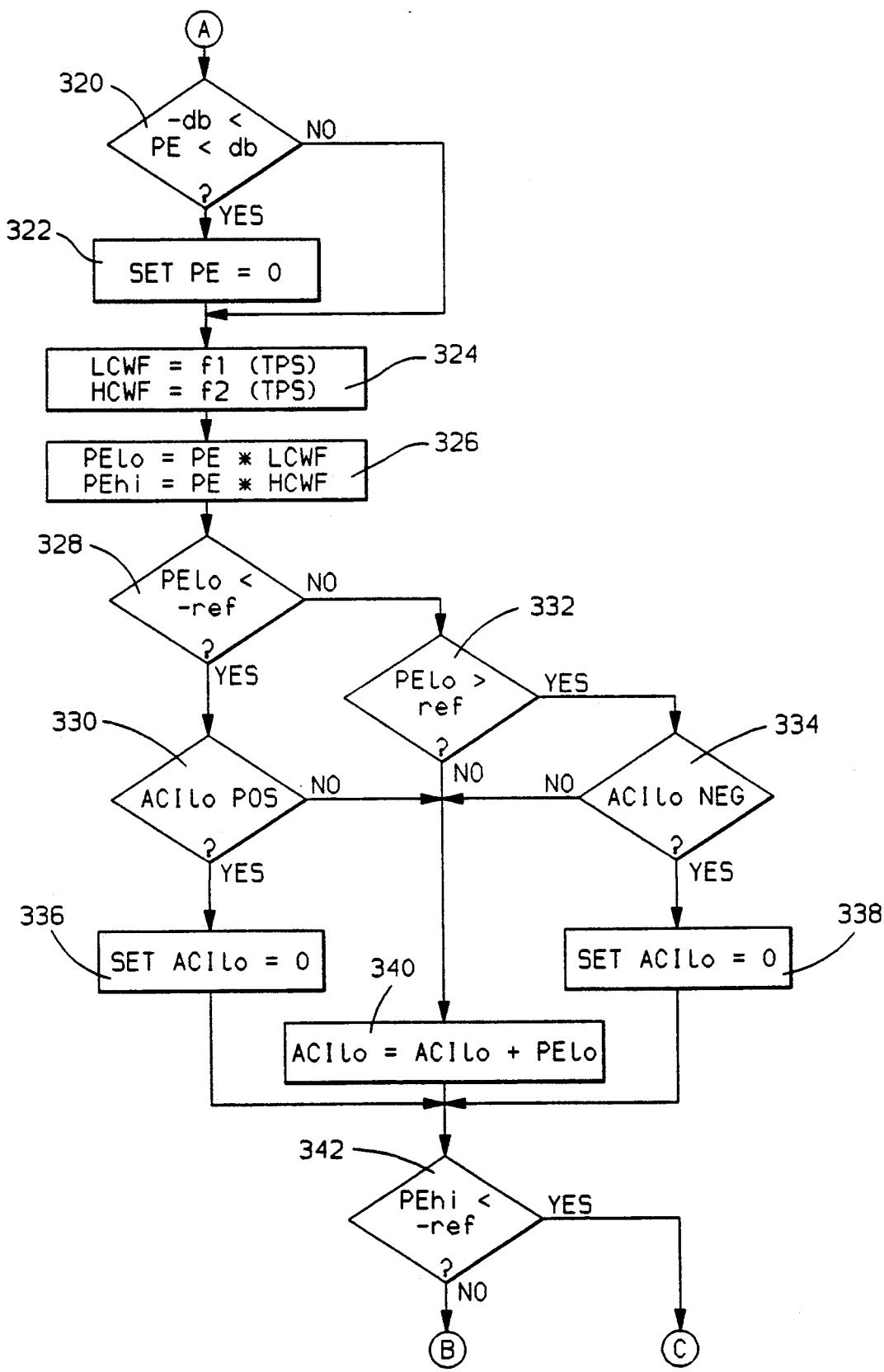
Figure 9C:
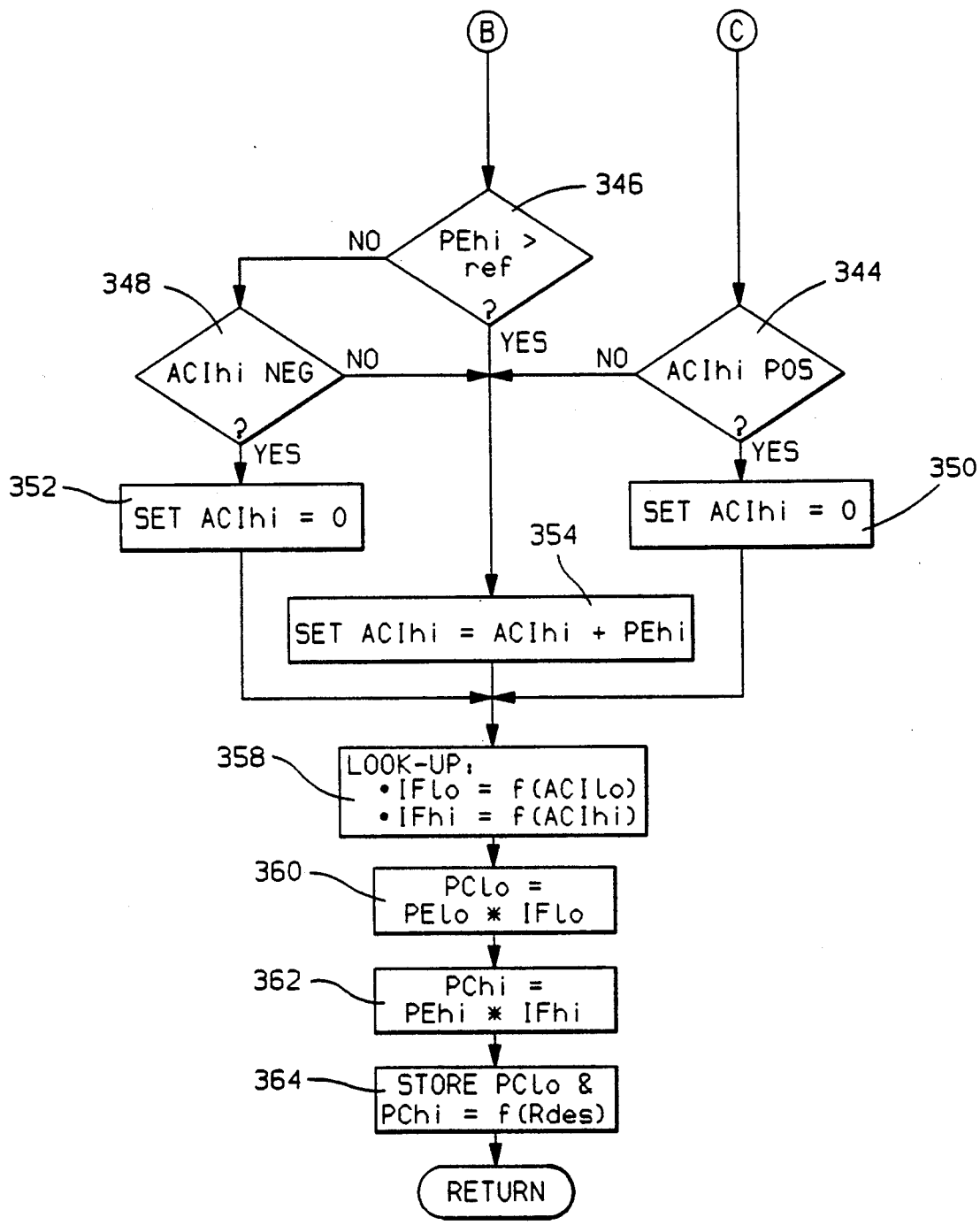

In the adaptive update flow diagram of FIGS. 9a-9c, the control unit 190 measures the shift time ta-tb as defined in reference to FIG. 4, and develops the high and low pressure correction terms PChi and PClo defined in reference to FIG. 6. If a single ratio upshift is not in progress, as determined at block 282, further execution of the routine is skipped, as indicated by the flow diagram line 284. Once it is determined that an upshift is in progress, the block 286 is executed to determine if the percentage of ratio completion (RATCOMP) is at least 20%.

When RATCOMP first reaches 20%, as determined at block 288, the block 290 is executed to initialize a SHIFT TIMER for measuring the shift time ta-tb. When RATCOMP reaches 80%, as determined at block 292, the blocks 294-298 are executed to reset the SHIFT IN PROGRESS indicator, to stop the SHIFT TIMER, and to look-up a desired shift time DST in relation to the shift torque STQ and the target speed ratio Rdes, as described in reference to block 220 of FIG. 6. In addition, the block 300 determines the pressures Pmst and Pdst corresponding to the measured shift time MST and the desired shift time DST, as described in reference to block 222 of FIG. 6, and the block 302 determines the overall pressure error PE according to the difference (Pmst−Pdst). This difference may be positive or negative for increasing or decreasing the base pressure command defined at block 264 of FIG. 8.

Turning to FIGS. 9b-9c, the blocks 320-322 are first executed to zero the overall pressure error PE if its value lies within a deadband defined by ±db. The blocks 324-326 are then executed to apportion the overall pressure error between low and high pressure error cells PElo and PEhi, based on the low and high cell weight factors LCWF and HCWF. The weight factors, as indicated at blocks 232 and 236 of FIG. 6, are determined in relation to the shift torque STQ.

The blocks 328-334 compare the low cell pressure error PElo with a low cell adaptive correction integrator term ACIlo. If PElo is significantly negative, but ACIlo is positive, as determined at blocks 328-330, the block 336 is executed to reset ACIlo to zero. Similarly, if PElo is significantly positive, but ACIlo is negative, as determined at blocks 332-334, the block 338 is executed to reset ACIlo to zero. Otherwise, block 340 is executed to add PElo to ACIlo, updating the integrator term.

The blocks 342-348 compare the high cell pressure error PEhi with a high cell adaptive correction integrator term ACIhi. If PEhi is significantly negative, but ACIhi is positive, as determined at blocks 342-344, the block 350 is executed to reset ACIhi to zero. Similarly, if PEhi is significantly positive, but ACIhi is negative, as determined at blocks 346-348, the block 352 is executed to reset ACIhi to zero. Otherwise, block 354 is executed to add PEhi to ACIhi to update the integrator term.

The blocks 328-338 and 342-352, taken together, operate to reduce the influence of spurious data in the determination of pressure error PE. By resetting the integrator terms when the respective error cells suddenly change sign, adaptive pressure corrections based on the suspect pressure error information is avoided.

The block 358 is then executed to determine low and high integrator factors IFlo and IFhi based on ACIlo and ACIhi, respectively, as described in reference to the block 244 of FIG. 6. The blocks 360-362 then apply IFlo and IFhi to the respective low and high pressure error cells PElo and PEhi to form low and high pressure correction terms PClo and PChi. Finally, the block 364 is executed to store the pressure correction terms PClo and PChi as a function of the target speed ratio Rdes, updating the two-point adaptive pressure correction table addressed at block 268 in FIG. 8.

While this invention has been described in reference to the illustrated embodiment, it is expected that various modifications will occur to those skilled in the art. In this regard, it should be realized that controls incorporating such modifications may fall within the scope of this invention, which is defined by the appended claims.

The embodiments of the invention in which an exclusive property or privilege is claimed are defined as follows:

1. In a motor vehicle multiple speed ratio automatic transmission including a fluid operated torque transmitting device to be engaged for shifting the transmission from a current speed ratio to a target speed ratio, means for regulating a fluid pressure supplied to said torque transmitting device in accordance with a predetermined pressure command for engaging such device, control apparatus comprising:

means for forming a measured shift time signal corresponding to a measured duration of a predetermined portion of a shift to said target speed ratio;

means for forming a desired shift time signal corresponding to a desired duration of said predetermined portion of a shift to said target;

means for applying said desired shift time signal and said measured shift time signal to a predetermined shift time vs. supply pressure characteristic to form first and second pressure signals corresponding to said desired and measured durations, respectively;

means for forming a pressure correction signal in relation to a difference between said first and second pressure signals; and correction means for adjusting said predetermined pressure command in accordance with said pressure correction signal during a subsequent engagement of said torque transmitting device.

2. The control apparatus set forth in claim 1, wherein said correction means comprises:

means for forming a gain factor in relation to an integral of said pressure correction signal; and means for adjusting said predetermined pressure command in accordance with the product of said pressure correction signal and said gain factor.

3. The control apparatus set forth in claim 2, including means for resetting said gain factor when said pressure correction signal changes sign in relation to the integral of said pressure correction signal.

* * * * *